United States Patent Office 3,576,780
Patented Apr. 27, 1971

3,576,780
PROCESSABLE BISPHENOL POLYESTER COMPOSITIONS
Winston J. Jackson, Jr., Kingsport, Tenn., assignor to Eastman Kodak Company, Rochester, N.Y.
No Drawing. Filed Mar. 28, 1969, Ser. No. 811,667
Int. Cl. C08g 51/50
U.S. Cl. 260—30.6    16 Claims

ABSTRACT OF THE DISCLOSURE

The composition of matter comprising bisphenol polyester material, the acid portion of which comprises at least in part a cyclic dicarboxylic acid component, blended with from about 2 to about 30% by weight of triaryl phosphate has reduced glass transition and heat distortion temperatures which make the composition more readily processable.

---

This invention relates to polyester compositions from bisphenols and cyclic dicarboxylic acids, blended with triaryl phosphates, and having markedly improved processability and other desirable properties such as improved flame resistance.

Bisphenol polyesters of cyclic dicarboxylic acids have high glass transition temperatures and heat-distortion temperatures. Consequently, they also have high melt viscosities and require high processing and fabrication temperatures for forming into shaped articles. The glass transition temperatures, heat distortion temperatures, melt viscosities, and fabrication temperatures can be reduced by blending various types of compounds with the polyesters. These compounds normally fall into one of two classes—plasticizers or antiplasticizers. Plasticizers increase the elongation and impact strength, but they also decrease the hardness, tensile strength, and stiffness. Antiplasticizers increase the hardness, tensile strength, and stiffness, but they decrease the elongation and impact strength. These effects of plasticizers and antiplasticizers are discussed in detail in J. Appl. Polymer Sci., 11, 211, 227 (1967).

Objects of the present invention, therefore, are: to reduce the glass transition and heat-distortion temperatures, melt viscosities, and fabrication temperatures of bisphenol polyesters without appreciably decreasing the hardness, tensile strength, stiffness, elongation, or impact strength; to provide a commercially practicable method for so improving the processability of bisphenol polyesters; to provide such readily processable compositions; and to provide shaped articles of such compositions having a highly useful balance of properties, including exceptional flame resistance.

These and other objects hereinafter appearing have been attained in accordance with the present invention through the discovery that minor amounts of triaryl phosphates in blends with bisphenol polyesters markedly reduce the glass transition and heat-distortion temperatures while maintaining substantially or improving original values of properties such as hardness, tensile strength, stiffness, elongation, impact strength, and flame resistance. This discovery is quite unexpected in view of the real adverse effects on impact strength obtained by such additives as triphenyl phosphate and tricresyl phosphate on, for example, bisphenol A polycarbonate as shown in Table 2 below.

The present invention may be expressed in a broad sense, in regard to the composition of matter having markedly reduced melt viscosity, as comprising bisphenol polyester material, the acid portion of which comprises at least in part a cyclic dicarboxylic acid component, blended with from about 2 to about 30% by weight of triaryl phosphate. The term "a cyclic dicarboxylic acid component" includes, of course, the various condensable derivatives of the acids such as lower alkyl esters or anhydrides which may be employed in such reactions with diol components of their condensable derivatives to prepare polyesters.

In a preferred sense the blend of the present invention may be stated as a composition of matter comprising the polyester of bisphenol A and terephthalic or isophthalic acid or an admixture of these acids in any proportion, blended with from about 5 to about 15% by weight of triphenyl phosphate. Most preferred are terephthalic to isophthalic ratios of 1/1 to about 3/1, and 6/4 to about 7/3. Here again the acids and phenols include, where applicable, their condensable derivatives.

The polyester component of this invention is derived from at least one bisphenol and an acid component comprising at least one cyclic dicarboxylic acid. Examples of bisphenols, including aromatic diols, which may be used include 4,4'-isopropylidenediphenol (also known as bisphenol A), 4,4'-cyclohexylidenediphenol, 4,4'-cyclohexylenediphenol, 4,4'-(2 norbornylidene) diphenol, 4,4'-thiodiphenol, 4,4' - sulfonyldiphenol, 4,4' - oxydiphenol, 4,4'-methylenediphenol, 4,4' - dihydroxybiphenyl, 4,4' - isopropylidenebis(2,6 - dichlorophenol), hydroquinone, resorcinol, naphthalenediols, and other dihydric phenols listed in U.S. Pats. 3,030,335 and 3,317,466. Also aliphatic diols (e.g., ethylene glycol or neopentyl glycol) may be used to give copolyesters, but cyclic and particularly aromatic diols are preferred. Examples of aromatic acids which may be used to prepare the polyesters include terephthalic acid, isophthalic acid, 5-tert-butylisophthalic acid, diphenic acid, 4,4'-methylenedibenzoic acid, 4,4'-oxydibenzoic acid, and 4,4'-sulfonyldibenzoic acid, naphthalenedicarboxylic acids, chloroterephthalic acid, and dichloroterephthalic acid. The aliphatic (e.g., adipic, azelaic) or alicyclic (e.g., cyclohexanedicarboxylic, norbornanedicarboxylic) acids may be used to give copolyesters, but as aforesaid the aromatic acids are preferred. Aromatic hydroxy acids also may be used, such as m- or p-hydroxybenzoic acid. Two or more aromatic diols or dicarboxylic acids may be used to give copolyesters or block polymers.

Most of these bisphenol polyesters and copolyesters can be prepared by ester interchange of the bisphenols with diphenyl esters of the dicarboxylic acids. Experimental details are described in various literature and patent references, such as U.S. Pat. 3,220,977. The polyester also can be prepared from the bisphenols and dicarboxylic acid chlorides in the presence of tertiary amines, such as described in U.S. Pat. 3,234,168, or by the interfacial polycondensation of bisphenols and dicarboxylic acid chlorides in an aqueous alkaline medium (U.S. Pat. 3,216,970). Another preparative method consists of heating bisphenol diacetates with dicarboxylic acids (U.S. Pat. 3,317,464).

The triaryl phosphates which are blended with the bisphenol polyesters have the following structure:

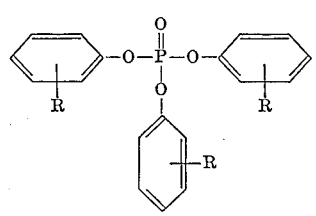

wherein R is hydrogen, chlorine, phenyl or an alkyl radical containing from 1 to 4 carbon atoms. Examples include triphenyl phosphate, tricresyl phosphate, tris(o-chlorophenyl)phosphate, tris(p - tert - butylphenyl)phosphate, bis(p-tert-butylphenyl) phenyl phosphate, 2-biphenylyl diphenyl phosphate, and di(2-biphenylyl)phenyl phosphate.

Various conventional techniques may be used to blend the phosphate with the polyester. The two components may be melted together in an inert atmosphere and stirred to effect the blending. The phosphate also may be deposited on the surface of the polyester particles by stirring the particles with a solution of the phosphate in a volatile solvent which will not dissolve or swell the polyester and then evaporating the solvent. Suitable solvents include alcohols, ketones, and saturated hydrocarbons. Better blending is obtained by then melting the coated particles in a screw-fed extruder and extruding the blend. Another blending method is to dissolve the polyester and phosphate together in a volatile solvent, such as chloroform, and then spray-drying.

The blends may contain from about 2 to about 30 wt percent of the triaryl phosphate and preferably from about 5 to 15 wt. percent. The higher amounts of phosphate tend to decrease the tensile strength of the polyester but increase the impact strength; they also greatly decrease the heat-distortion temperature and processing temperature as shown in Tables 1 and 2.

Triphenyl phosphate is the preferred phosphate. It is superior to the substituted triaryl phosphates, such as tricresyl phosphate or tri(o-chlorophenyl)phosphate, in that only a nominal decrease in notched Izod impact strength occurs when 10 wt. percent is blended with the polyester (Tables 1 and 2). Also, it greatly increases the ball-drop impact strength of molded plaques. The effects of the preferred triphenyl phosphate on the properties of bisphenol A polycarbonate are shown in Table 2 (Polyester K at top of table). Although the tensile strength is increased, the stiffness (flexural modulus) is decreased, and the notched Izod impact strength is very adversely affected (a decrease to 15% of the value of the unmodified polymer). The same amount of triphenyl phosphate in Polyester A in the table has almost no effect on the notched Izod impact strength.

Tables 1 and 2 also show that 5–15 wt. percent of the phosphate additives not only does not appreciably decrease the hardness, tensile strength, or stiffness (flexural modulus) of the polyesters but in several cases (increases these properties somewhat. Even 30 wt. percent of the additives does not appreciably decrease the flexural modulus. These results are very unusual because, as discussed earlier, compounds which are added to lower the fabrication and molding temperatures of polyesters are normally either plasticizers or antiplasticizers. Both of these additives significantly decrease certain properties of the plastic. Plasticizers reduce the hardness, tensile strength, and stiffness whereas antiplasticizers reduce the impact strength. Surprisingly, the triaryl phosphates do not greatly decrease any of these properties, and one additive, triphenyl phosphate, even increases the ball-drop impact strength.

These additives, in effect, are in the area between plasticizers and antiplasticizers in their effect on plastics. They do not fall under the definition of antiplasticizers in J. Appl. Polymer Sci., 11, 211 (1976) because their glass transition temperature is too low (below −50° C.) and/or their molecular size is too great (over 5.5 A. in thickness). As is pointed out in Table VI of this paper (p. 222), the glass transition temperature (Tg) of tri-o-cresyl phosphate is −61° C. The Tg of triphenyl phosphate is −66° C.

The blends of this invention may also contain various stabilizers, pigments, antioxidants, and other additives. Also, glass or asbestos fibers may be present to improve the stiffness and tensile properties.

The following examples will further illustrate the invention.

BLENDS

The blends may be prepared by two exemplary methods. In Method A, the bisphenol polyester is ground to pass a 2-mm. screen and placed in a flask with the triaryl phosphate. The flask is evacuated and released to nitrogen three times to remove all traces of air. It is then heated to 150° C./0.5 mm., and the mixture is slowly stirred for 1 hr. to remove all traces of moisture. The vacuum is released to nitrogen, and the mixture is then stirred under nitrogen at 295–340° C. for 30 min. to melt blend the components. After the blend has cooled under nitrogen, it is broken out of the flask and ground to pass a ¼-in. screen.

In Method B, the triaryl phosphate is dissolved in acetone, the polyester (ground to pass a 2-mm. screen) is added, and the phosphate is deposited on the particles as the acetone is evaporated. The particles are dried in an oven at 80° C. and the blend is extruded in a screw-fed extruder (Plastic-Corder from C. W. Brabender Instruments, Inc., South Hackensack, N.J.). The extruded rod is cut into pellets.

PHYSICAL PROPERTIES

The above blends are injection-molded in a Watson-Stillman one-ounce injection-molding press to give $\frac{1}{16}$-in. tensile bars and ⅛-in. flexure bars. The heat-distortion temperature of the flexure bars at a load of 264 p.s.i. is also a measure of the glass transition temperature, which is decreased by the phosphate additives. Reduction of the glass transition temperature also reduces the melt viscosity; this is indicated by the lower molding temperature. The heat-distortion temperatures are measured in a forced-convection oven (deflection corresponding to the strain in ASTM D648). ASTM procedures are used for measuring Rockwell hardness (ASTM D785, Method A), tensile strength and elongation (ASTM D1708), flexural modulus (ASTM D790), and notched Izod impact strength (ASTM D256, Method A). The ball-drop impact strength is determined with 4 x 4 x ⅛-in. plaques (molded in a 6-ounce injection-molding machine). The inherent viscosities (I.V.) are determined at 25° C. in 60/40 phenol/tetrachloroethane at a concentration of 0.23 g./100 ml.

The properties of injection-molded plastics in Table 1 are determined with blends made by Method A with a polyester (I.V. 0.80) prepared from bisphenol A diacetate and equimolar amounts of terephthalic and isophthalic acids.

The properties of injection-molded plastics in Table 2 are determined with blends prepared by Method B with the following polyesters. For comparative purposes, the polycarbonate of bisphenol A (Lexan 125 from the Gen-

TABLE 1

| Additive | | Molding temp., °F. | Heat-distortion temp., °C. | Rockwell hardness, L | Tensile strength, p.s.i. | | Elong. at break, percent | Flexural modulus, 10⁵ p.s.i. | Izod impact strength ft.-lb./in. notch |
| --- | --- | --- | --- | --- | --- | --- | --- | --- | --- |
| Name | Conc., percent | | | | At yield | At break | | | |
| None (control) | 0 | 750 | 190 | 107 | 10,100 | 9,600 | 47 | 3.1 | 2.3 |
| Triphenyl phosphate | 5 | 675 | 160 | 109 | 10,700 | 10,900 | 58 | 3.7 | 2.3 |
| Do | 10 | 625 | 138 | 109 | 10,100 | 9,500 | 40 | 3.4 | ¹ 11.8 |
| Do | 15 | 600 | 109 | 105 | 9,500 | 9,600 | 50 | 3.1 | 2.0 |
| Tricresyl phosphate | 10 | 625 | 128 | 114 | 10,800 | 10,100 | 36 | 3.6 | 1.1 |
| Tris(o-chlorophenyl)phosphate | 10 | 675 | 150 | 113 | 10,500 | 9,700 | 36 | 3.0 | 0.8 |
| Bis(p-tert-butylphenyl) phenyl phosphate | 10 | 650 | 140 | 114 | 10,500 | 10,000 | 40 | 3.5 | 1.6 |
| 2-biphenylyl diphenyl phosphate | 10 | 675 | 137 | 119 | 10,700 | 10,600 | 62 | 3.7 | 1.7 |
| Do | 20 | 600 | 88 | 105 | 8,800 | 9,700 | 70 | 3.3 | 1.9 |
| Do | 30 | 550 | 60 | 80 | 6,700 | 6,400 | 84 | 3.0 | 3.8 |

¹ The ball-drop impact strength is 23 ft.-lb. as compared to 14 ft.-lb. for the control containing no additive.

eral Electric Co.) is included at the top of Table 2 and is designated as K.

| Polyester | Polyester reactants | I.V. |
|---|---|---|
| A | Bisphenol A diacetate and 65/35 mixture of terephthalic and isophthalic acids | 0.78 |
| B | Bisphenol A diacetate and 80/20 mixture of terephthalic and isophthalic acids | 0.70 |
| C | Bisphenol A diacetate and isophthalic acid | 0.82 |
| D | 4,4'-(2-norbornylidene)diphenol and 80/20 mixture of diphenyl isophthalate and diphenyl azelate | 0.65 |

Tables 1 and 2 above illustrate the results which are obtained when the polymers are molded on a small, one-ounce, ram-type, injection-molding press. Higher impact strengths can sometimes be obtained with large reciprocating screw injection-molding machines. The following properties are obtained with 0.125-in. thick bars molded on a Van Dorn 200RS–6, 6-ounce machine, using ⅛-in. pellets of Polyester A (I.V. 0.69) and ⅛-in. pellets of the

TABLE 2

| Polyester | Additive Name | Concn., percent | Molding temp., °F. | Heat-distortion temp., °C. | Rockwell hardness, L | Tensile strength, p.s.i. At yield | Tensile strength, p.s.i. At break | Elong. at break, percent | Modulus, $10^5$ p.s.i. | Izod impact strength, ft.-lb./in. notch |
|---|---|---|---|---|---|---|---|---|---|---|
| K | None (control) | 0 | 650 | 148 | 94 | 9,000 | 9,800 | 67 | 3.1 | 9.1 |
| K | Triphenyl phosphate | 10 | 600 | 103 | 93 | 10,200 | 13,000 | 102 | 3.2 | 1.4 |
| A | None (control) | 0 | 750 | 194 | 110 | 10,500 | 9,500 | 19 | 3.1 | 2.7 |
| A | Triphenyl phosphate | 2 | 725 | 190 | 111 | 10,500 | 12,400 | 30 | 3.2 | 3.2 |
| A | do | 10 | 675 | 135 | 108 | 10,400 | 9,000 | 16 | 3.5 | 2.6 |
| A | do | 20 | 575 | 83 | 95 | 8,000 | 9,200 | 80 | 3.2 | 2.6 |
| A | do | 30 | 550 | 54 | 58 | 5,800 | 6,200 | 98 | 2.8 | 5.8 |
| A | Tricresyl phosphate | 10 | 650 | 130 | 112 | 10,700 | 10,000 | 15 | 3.5 | 1.3 |
| B | None (control) | 0 | 750 | 197 | 107 | 10,200 | 10,500 | 32 | 3.1 | 4.4 |
| B | Di(2-biphenyl) phenyl phosphate | 15 | 650 | 114 | 106 | 10,200 | 10,300 | 40 | 3.3 | 4.0 |
| C | None (control) | 0 | 700 | 179 | 107 | 10,200 | 10,600 | 80 | 2.9 | 4.2 |
| C | Triphenyl phosphate | 10 | 650 | 122 | 107 | 10,400 | 10,100 | 62 | 3.2 | 3.8 |
| D | None (control) | 0 | 775 | 225 | 106 | 10,000 | 9,800 | 50 | 2.9 | 1.5 |
| D | Triphenyl phosphate | 15 | 625 | 114 | 101 | 9,800 | 10,000 | 44 | 3.0 | 1.4 |
| D | Tricresyl phosphate | 15 | 625 | 105 | 104 | 10,200 | 10,300 | 38 | 3.2 | 0.9 |

It is also surprising that the phosphate additives are so stable at the extremely high temperatures required for injection-molding the polymers and that they do not contribute to polymer instability. Tables 1 and 2 show the use of the additives at molding temperatures of 675–725° F. (357–385° C.). Similar additives have been used to plasticize other classes of polymers, but the temperatures involved were considerably lower.

It is also very surprising that these phosphate additives have a very significant effect in reducing the flammability of the plastics even though only a small amount of phosphorus is present in the final product. It is known that the presence of phosphorus reduces the flammability, but it is surprising to find that the presence of only 0.95% phosphorus has a considerable effect: 10% triphenyl phosphate in polyester A of Table 2 increases the oxygen index by the Oxygen Index Flammability Test from 0.37 to 0.46. This test is described in Modern Plastics, November 1966, p. 141. The above index values indicate that 37% oxygen in an oxygen/nitrogen mixture will sustain candle-like burning of a molded bar containing no phosphate whereas 46% oxygen is required to sustain combustion when 10 wt. percent triphenyl phosphate is also present (0.95% phosphorus in the bar). Triaryl phosphates which also contain halogen, e.g., tris(o-chlorophenyl)phosphate of Table 1, impart even greater fire-retardant properties.

Effects similar to those in Tables 1 and 2 are obtained when 15 wt. percent of triphenyl phosphate is incorporated into polyesters prepared from the following reactants:

4,4'-(hexahydro - 4,7 - methanoindan-5-ylidene)diphenol and diphenyl trans-1,4-cyclohexane-dicarboxylate; I.V. 0.63

80/20 molar mixture of bisphenol A and 4,4'-isopropylidenebis(2,6-dibromophenol) with isophthaloyl chloride; I.V. 0.59

4,4'-cyclohexylidenediphenol and diphenyl 2,6-naphthalenedicarboxylate; I.V. 0.66

70/30 molar mixture of hydroquinone diacetate and resorcinol diacetate with 70/30 4,4'-sulfonyldibenzoic acid/azelaic acid; I.V. 0.58.

same polymer (I.V. 0.69) containing 10% triphenyl phosphate (TPP):

| | Polyester A | Polyester A/ 10% TPP |
|---|---|---|
| Molding temperature, °F | 720 | 610 |
| Heat-distortion temp., °C | 195 | 134 |
| Rockwell hardness, M scale | 81 | 81 |
| Yield strength, p.s.i | 9,800 | 9,400 |
| Break strength, p.s.i | 9,600 | 9,200 |
| Elongation at break, percent | 47 | 55 |
| Flexural strength, p.s.i | 14,600 | 15,300 |
| Flexural modulus, $10^5$ p.s.i | 3.1 | 3.7 |
| Izod impact strength, ft.-lb./in. notch | 5.0 | 5.9 |
| Ball-drop impact strength, ft.-lb | 18 | 27 |

The bisphenol polyester/triaryl phosphate blends of this invention also may be used as melt adhesive bonding agents. Polyester A above has a tensile shear strength on 0.064-inch cold-rolled steel of 2300 p.s.i. whereas the same polyester blended with 10 wt. percent of triphenyl phosphate (properties in Table 2) has a tensile shear strength of 2800 p.s.i. on the steel. The bonds are prepared by placing a film of the polyester between the steel substrates, clamping together, and immersing in a Wood's metal bath for 3 minutes. Because of the presence of the additive, the adhesive bonds are prepared at 320° C. (340° C. required for the control containing no additive). This blend also has good tensile shear strength on aluminum, titanium, chrome-plated steel, and glass. Other blends in Tables 1 and 2 also have good adhesion to these substrates.

Although this invention has been described in detail with particular reference to preferred embodiments thereof, it will be understood that variations and modifications can be effected within the spirit and scope of the invention as described hereinabove and as defined in the appended claims.

We claim:

1. Composition comprising components (1) and (2) as follows:

(1) a bisphenol polyester of which the acid component comprises at least 50 mole percent of an aromatic dicarboxylic acid, and (2) from about 2 to about 30 percent by weight, based on the sum of the weights of components (1) and (2), of a triaryl phosphate of the formula

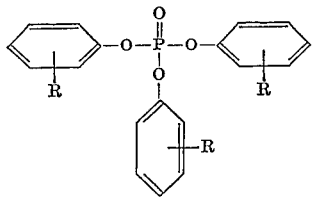

wherein R is hydrogen, chlorine, phenyl, or an alkyl radical containing from 1–4 carbon atoms.

2. The composition of claim 1 wherein the bisphenol is bisphenol A.

3. The composition of claim 1 wherein the acid portion of the polyester comprises from 1 to 100 mole percent of either terephthalic acid, isophthalic acid, or mixtures thereof.

4. The composition of claim 1 wherein the triaryl phosphate is triphenyl phosphate.

5. The composition of claim 1 wherein the bisphenol is bisphenol A, and the acid portion of the polyester comprises a mixture of terephthalic and isophthalic acids.

6. The composition of claim 5 wherein the molar ratio of terephthalic acid to isophthalic acid is from about 1/1 to about 3/1.

7. The composition of claim 6 wherein the triaryl phosphate is triphenyl phosphate.

8. The composition of claim 6 wherein the ratio of terephthalic acid to isophthalic acid is from about 6/4 to about 7/3.

9. The method for improving the high temperature processability of a bisphenol polyester defined as component (1) of claim 1 comprising intimately blending with said component (1) from about 2 to about 30% by weight of triaryl phosphate defined as component (2) of claim 1.

10. A shaped article of a composition as defined by claim 1.

11. The composition of claim 1 wherein the bisphenol is a dihydric phenol.

12. The composition of claim 11 wherein the dihydric phenol is hydroquinone.

13. The composition of claim 11 wherein the dihydric phenol is resorcinol.

14. The composition of claim 11 wherein the dihydric phenol is a naphthalenediol.

15. The composition of claim 11 wherein the dihydric phenol is a combination of hydroquinone and resorcinol.

16. Composition comprising components (1) and (2) as follows:
(1) a polyester of a dihydric phenol and a dicarboxylic acid of which the acid component comprises at least 50 mole percent of an aromatic dicarboxylic acid, and
(2) from about 2 to about 30 percent by weight, based on the sum of the weights of components (1) and (2), of a triaryl phosphate of the formula

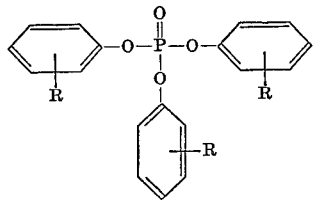

wherein R is hydrogen, chlorine, phenyl, or an alkyl radical containing from 1–4 carbon atoms.

References Cited
UNITED STATES PATENTS
3,428,714   9/1969   Sconce _____ 260—30.6

MORRIS LIEBMAN, Primary Examiner
L. T. JACOBS, Assistant Examiner